United States Patent Office 2,838,497
Patented June 10, 1958

2,838,497
6-FLUORO STEROIDS AND PROCESS

George B. Spero, Kalamazoo, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,453

36 Claims. (Cl. 260—239.55)

This invention relates to 6-fluorohydrocortisone and 21-esters thereof, to 6-fluorocortisone and 21-esters thereof, to novel intermediates in the production thereof and to processes for the production of the novel compounds and the novel intermediates.

This application is a continuation-in-part of application Serial No. 519,632, filed July 1, 1955, and of application Serial No. 634,828, filed January 18, 1957.

It has been discovered that 6-fluorohydrocortisone and the 21esters thereof and 6-fluorocortisone and 21-esters thereof possess valuable anti-rheumatoid arthritic, anti-inflammatory and glucocorticoid activity to a marked degree. Thus, for example, 6α-fluorohydrocortisone has been found to exhibit approximately nine times the glucocorticoid activity and 2.4 times the anti-inflammatory activity of hydrocortisone, while the 21-acetate is eleven times more active than hydrocortisone as a glucocorticoid and 8.7 times more active as an anti-inflammatory agent. Both compounds have a favorable effect on body electrolyte balance. In addition, these compounds are useful as intermediates for the production of 1-dehydro analogues which are of particular importance because they possess marked anti-rheumatoid arthritic, anti-inflammatory and glucocorticoid activities. For example, 1-dehydro-6α-fluorohydrocortisone has been found to exhibit approximately eighty times the glucocorticoid activity and five to twenty times the anti-inflammatory activity of hydrocortisone, while the 21-acetate is 100 times more active than hydrocortisone as a glucocorticoid. The compounds are useful in the treatment of inflammatory conditions of the skin, eyes and ears of humans and valuable domestic animals, contact dermatitis and other allergenic reactions. The compounds can be administered in conventional dosage forms such as pills, tablets and capsules for oral use or in conventional liquid forms as are used with natural and synthetic corical steroid hormones for injection use. For topical use they can be administered in the form of ointments, creams, lotions and the like with or without coacting antibiotics, germicides and the like.

The compounds of this invention can be prepared in accordance with the following scheme of reactions:

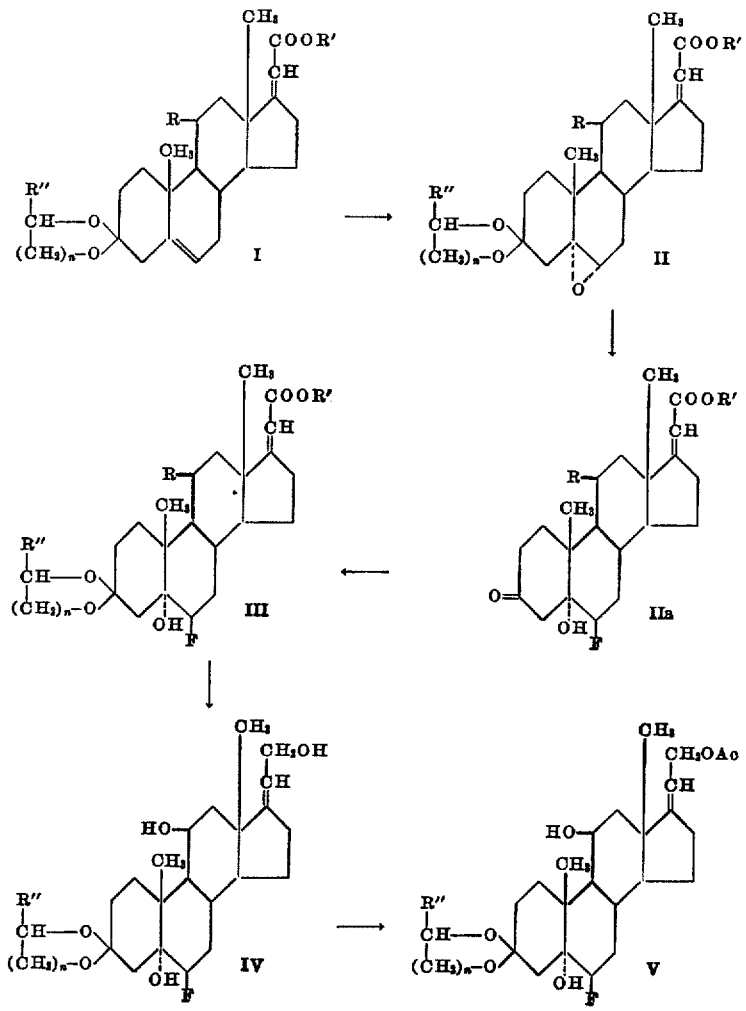

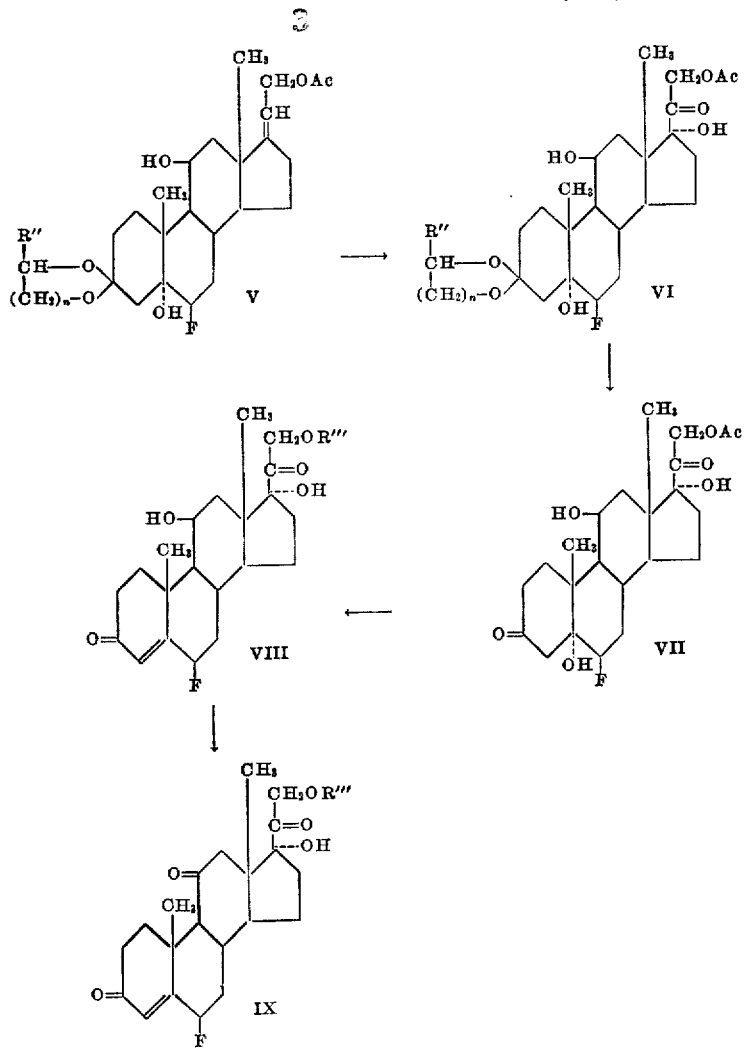

wherein R is hydroxy or keto, R' and R" are hydrogen or lower-alkyl, n is the whole number one or two, Ac is the acyl radical of an organic carboxylic acid, preferably a hydrocarbon carboxylic acid containing from one to twelve carbon atoms, inclusive, and R''' is hydrogen or Ac as defined above. The term lower-alkyl, when used herein, refers to an alkyl radical of from one to eight carbon atoms, inclusive, e. g., methyl, ethyl, propyl, butyl, amyl, hexyl, heptyl, ethylhexyl, and octyl.

The above reactions are described and exemplified hereinbelow. It will be understood by those skilled in the art, nevertheless, that the specific order of steps may be inverted or transposed or otherwise varied to suit the purposes of economics, convenience, or the like.

The preferred compounds containing the 17(20)-double bond have the cis configuration, because the cis isomers can ultimately be converted in higher yields in the oxidative hydroxylation step than is ordinarily possible with the trans isomer. It should be understood, however, that the trans isomer or mixtures of the cis and trans isomers can be used with satisfactory results.

In carrying out the epoxidation step shown above, a 3-ketal of 3-keto-11-oxygenated-4,17(20)-pregnadiene-21-carbonyloxy steroid (I), which can be prepared as disclosed in U. S. Patent 2,707,184, preferably the 3-ethylene ketal of methyl 3,11-diketo-4,17(20)-[cis]-pregnadien-21-oate, is epoxidized with a peracid, e. g., peracetic or perbenzoic, or other known epoxidizing agents, to produce the corresponding 5:6-oxide (II). A mixture of both the α- and β-oxides is produced in this epoxidation reaction, and the mixture can be separated by chromatographic or crystallization techniques known in the art.

In the oxide opening step, a 3-ketalized 3-keto-5α,6α-oxido-11-oxygenated-17(20)-pregnene - 21 - carbonyloxy steroid (II), is reacted with hydrogen fluoride to open the oxide ring and produce the corresponding 3-ketalized 3-keto-5-hydroxy-6-fluoro-11-oxygenated-17(20) - pregnene-21-carbonyloxy steroid (III). This epoxide opening step is ordinarily carried out at temperatures between about minus forty and plus fifty degrees centigrade, the preferred limits being between about zero and 25 degrees centigrade. It can be performed under anhydrous conditions in the presence or absence of a catalyst, e. g., boron trifluoride; or under aqueous conditions in the presence or absence of a catalyst such as a hypohalous acid.

If anhydrous conditions are difficult or inconvenient to maintain, the oxide opening reaction can be performed under aqueous conditions in which case the ketal will be hydrolyzed at the same time. The thus-produced 3-keto-group of IIa can then be reketalized in the manner described hereinabove to produce the corresponding ketal (III).

In the reduction step of the present invention, a 3-ketalized 3 - keto - 5-hydroxy-6-fluoro-11-oxygenated-17(20)-pregnene-21-carbonyloxy steroid (III), preferably the 3-ethylene glycol ketal of lower-alkyl, preferably methyl 3,11-diketo-5-hydroxy-6-fluoro-17(20)-[cis]-pregnen-21-oate, is reduced with lithium aluminum hydride or other chemical carboxyl reducing agent in an organic solvent, e. g., ether, dioxane, tetrahydrofuran, benzene, to produce the corresponding 3-ketalized 5,11β,21-trihydroxy-6-fluoro-17(20)-pregnen-3-one. At completion of this reaction, the reaction mixture is preferably mixed with water or, an acid, an ester or carbonyl agent followed by water, to decompose any excess lithium aluminum hydride and organo-metal complexes. The usual reaction conditions for a lithium aluminum hydride reduction are employed, except that a reaction temperature at room temperature or below is preferred, to ensure that reaction with the 6-fluoro does not occur, and acid, though operative and satisfactory under carefully controlled conditions, is preferably not employed in the decomposition step, to avoid undue hydrolysis of the ketal group.

The esterification step, i. e., to produce compound V, involves the conversion of a 21-hydroxy group of 5,11β, 21-trihydroxy-6-fluoro-17(20)-pregnen-3-one 3-alkylene ketal (IV) to a 21-acyloxy group. This reaction can be performed under the esterification conditions known in the art, e. g., by the reaction of IV with the selected acid halide or acid chloride or acid bromide or the anhydride of a hydrocarbon carboxylic acid, or by reaction with the selected acid, in the presence of an esterification catalyst or with an ester under ester exchange reaction conditions. Reaction conditions which are apt to affect the labile 11β-hydroxy group or 6-fluoro group should be avoided. Compounds thus produced include the compounds represented by Formula V wherein the 17(20)-configuration is cis, and Ac is the acyl radical of a hydrocarbon carboxylic acid containing from one to twelve carbon atoms, inclusive, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e. g., cyclopropylideneacetic, cyclopentylformic, cyclopentylacetic, β-cyclohexylpropionic, cyclohexylformic, cyclohexylacetic, an aryl or alkaryl acid, e. g., benzoic, 2-, 3- or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, an unsaturated acid, e. g., acrylic, vinyl acetic, propiolic, undecolic, etc.

The oxidative hydroxylation of V to VI is carried out by reaction with a catalytic amount of osmium tetroxide and an oxidizing agent such as hydrogen peroxide, peracids, alkyl peroxides, amine oxide peroxides, and the like. A preferred procedure involves the use of two to three molar equivalents of one of the oxidizing agents and less than 0.05 molar equivalent of osmium tetroxide, calculated on the basis of V, using tertiary butyl alcohol as the reaction medium and carrying out the reaction at about room temperature.

The hydrolysis step involves the hydrolysis of the ketal group of the 3-ketalized 5,11β,17α-trihydroxy-6-fluoro-21-acyloxypregnane-3,20-dione, e. g., the ethylene glycol ketal thereof, employing aqueous acid to produce the corresponding diketo compound VII. The hydrolysis is conveniently performed under relatively mild conditions, e. g., at room temperature with acetic acid or dilute sulfuric acid.

The dehydration reaction is carried out using a mineral acid such as, for example, hydrogen chloride; or Girard's reagent T. Acetic anhydride, p-toluenesulfonic acid and acetic acid, or thionyl chloride and pyridine are also suitable as dehydrating agents. Care should be taken in this step to avoid various reaction conditions that would affect the 11β-hydroxy group.

Compound VIII in the form of the 21-ester can be oxidized to the corresponding 11-keto compound. i. e., 17α-hydroxy-6-fluoro-21-acyloxy - 3,11,20 - trione (compound IX), in accordance with the process for the oxidation of the 21-esters of Kendall's compound F as disclosed in U. S. Patent No. 2,751,402.

Either of compounds VIII or IX can be transformed to the free 21-alcohol by hydrolysis with a base. A preferred procedure is to employ at least a molar equivalent of an alkali-metal bicarbonate or an alkali-metal carbonate in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete, the reaction mixture is neutralized with an acid, e. g., acetic acid, and the hydrolyzed product recovered from the reaction mixture by evaporation and crystallization, extraction with methylene chloride, or the like.

As previously mentioned, the order of the various steps outlined above can be varied considerably. Suitable variations will occur to those skilled in the art, and the necessary adjustments can be readily appreciated and carried out by skilled chemists. For example, compound IV can be hydrolyzed to remove the 3-ketal, and this step followed in turn by 21-acylation, 5-dehydration and oxidative hydroxylation under the above-described conditions. In addition, ketal removal and dehydration of compound VI with, for example, hydrochloric acid in chloroform, is directly productive of compound VIII without isolation of the intermediate compound VII.

The foregoing compounds, VIII or IX, all characterized by the presence of a 6-fluoro substituent, can exist in either the 6α- or the 6β-epimeric form. The foregoing process produces a mixture in which the 6β-form predominates. The 6α-epimer can be separated from the products by chromatographic or fractional crystallization techniques known in the art. The compounds are useful, however, as mixtures produced directly from the synthesis steps described. It is occasionally desirable, nevertheless, to obtain the 6α-epimer from the mixture by separation or by epimerization. Conversion of the 6β-epimer or mixtures predominating therein can be accomplished by treatment at temperatures of zero degrees centigrade or slightly below in an organic solvent, such as chloroform, methylene chloride, ether, and the like, and in the presence of a prototropic agent (a proton-donating reagent) such as water, alcohols, organic acids, and the like, with a mineral acid, such as, for example, hydrochloric acid. The mixture should be maintained at temperatures below zero degrees centigrade, or at least below room temperature during the addition of the acid. The reaction mixture can then be washed with successive portions of dilute alkali and water, and then dried and evaporated under reduced pressure. The 6α-fluoro product can be recovered from the crude reaction product and purified by recrystallization.

The following examples are illustrative of the process and products of the present invention but are not to be construed as limiting.

EXAMPLE 1

*The 3-ethylene ketal of methyl 3,11-diketo-5α,6α-oxido-17(20)-[cis]-pregnen-21-oate*

To a solution of 5.0 grams of the 3-ethylene glycol ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene ketal of methyl 3,11-diketo-5α,6α-oxido-17(20)-[cis]-pregnen-21-oate melting at 206 to 209 degrees centigrade having a $[\alpha]_D$ of plus 37 degrees (CHCl$_3$) and having the analysis given below:

*Analysis.*—Calculated for $C_{24}H_{32}O_6$: C, 69.20; H, 7.75. Found: C, 69.59; H, 7.81.

Example 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene ketal of methyl 3,11-diketo-5α,6α-oxido-17(29)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried and evaporated to dryness to give 1.62 grams of crude solid. Chromatography gave two fractions: (A) 481 milligrams eluted with methylene chloride plus five percent acetone, and (B) 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17-(20)-allopregnen-21-oate, melting point 254 to 260 degress centigrade. An analytical sample melted at 260 to 263 degrees centigrade.

*Analysis.*—Calculated for $C_{22}H_{29}O_5F$: F, 4.84. Found: F, 4.47.

Fraction B, on crystallization from acetone-Skellysolve B hexanes, gave 470 milligrams of methyl 3,11-diketo-5α,-6β-dihydroxy-17(20)-allopregnen-21-oate, melting point 235 to 245 degrees centigrade. An analytical sample melted at 245 to 248 degrees centigrade.

*Analysis.*—Calculated for $C_{22}H_{30}O_6$: C, 67.67; H, 7.74. Found: C, 67.91; H, 7.62.

Example 3

*Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy - 6β - fluoro - 17(20) - allopregnen - 21 - oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11 - diketo - 5α - hydroxy - 6β - fluoro - 17(20)-allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol is productive of the respective 3-alkylene ketals of methyl 3,11-diketo-5α-hydroxy-6β-fluoro-17(20)-allopregnen-21-oate.

Example 4

*5α,11β,21-trihydroxy-6β-fluoro-17(20)-allopregnen-3-one 3-ethylene ketal*

To a solution of 1.96 grams of methyl 3,11-diketo-5α-hydroxy - 6β - fluoro - 17(20) - allopregnen - 21 - oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21 - trihydroxy - 6β - fluoro - 17(20) - allopregnen-3-one 3-ethylene ketal, melting point 197 to 205 degrees centigrade. An additional 226 milligrams was obtained from the mother liquor, melting point 175 to 185 degrees centigrade.

Example 5

*5α,11β-dihydroxy-6β-fluoro-21-acetoxy-17(20)-allopregnen-3-one 3-ethylene ketal*

The acetate was prepared by allowing 0.87 gram of 5α,11β,21 - trihydroxy - 6β - fluoro - 17(20) - allopregnen-3-one 3-ethylene ketal to stand overnight in ten milliliters of acetic anhydride and ten milliliters of pyridine. The solution was then poured into ice water to give 0.92 gram of 5α,11β - dihydroxy - 6β - fluoro - 21 - acetoxy-17(20) - allopregnen - 3 - one 3 - ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21 - trihydroxy - 6β - fluoro - 17(20) - allopregnen-3-one 3-ethylene ketals are prepared wherein the 21-acyloxy group is formyloxy, propionyloxy, butyryloxy, valeryloxy, hexanoxyloxy, heptanoyloxy, octanoyloxy, benzyloxy, phenylacetoxy, or the like, by contacting 5α,11β,21 - trihydroxy - 6β - fluoro - 17(20) - allopregnen-3-one 3-ethylene ketal with an appropriate acylating agent, e. g., the anhydride or acid halide of the selected acid in a solvent such as, for example, benzene, toluene, pyridine, or the like.

Example 6

*5α,11β,17α-trihydroxy-6β-fluoro-21-acetoxyallopregnane-3,20-dione 3-ethylene ketal*

To a solution of 0.77 gram of 5α,11β - dihydroxy - 6β-fluoro - 21 - acetoxy - 17(20) - allopregnen - 3 - one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams $OsO_4$ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α - trihydroxy - 6β - fluoro - 21 - acetoxyallopregnane - 3,20 - dione 3 - ethylene ketal, melting point 220 to 228 degrees centigrade.

Example 7

*5α,11β,17α-trihydroxy-6β-fluoro-21-acetoxyallopregnane-3,20-dione*

A solution of 0.47 gram of 5α,11β,17α - trihydroxy-6β - fluoro - 21 - acetoxyallopregnane - 3,20 - dione 3-ethylene ketal in 35 milliliters of acetone and four milliliters of 1 N sulfuric acid solution was gently boiled on the steam bath for ten minutes, cooled and neutralized with dilute sodium bicarbonate solution. Addition of water and cooling gave 0.33 gram of 5α,11β,17α-trihydroxy - 6β - fluoro - 21 - acetoxyallopregnane - 3,20 - dione, melting point 230 to 240 degrees centigrade.

Example 8

*6β-fluoro-11β,17α-dihydroxy-21-acetoxy-4-pregnene-3,20-dione (6β-fluorohydrocortisone acetate)*

A solution of 100 milligrams of 5α,11β,17α-trihydroxy-6β - fluoro - 21 - acetoxyallopregnane - 3,20 - dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β - fluoro-11β,17α - dihydroxy - 21 - acetoxy - 4 - pregnene - 3,20-dione (6β-fluorohydrocortisone acetate), melting point 210 to 218 degrees centigrade. Infrared data and ultraviolet data were found to be in agreement with the structure.

Example 9

Isomerization of 6β- to 6α-fluorohydrocortisone acetate

A solution of 0.132 gram of 6β-fluorohydrocortisone acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 42 milligrams of product, 6α-fluorohydrocortisone acetate, melting point 203 to 210 degrees centigrade.

Example 10

6β-fluoro-17α-hydroxy-21-acetoxy-4-pregnene-3,11,20- trione (6β-fluorocortisone acetate) and 6α-fluoro-17α-hydroxy-21-acetoxy-4-pregnene-3,11,20-trione (6α-fluorocortisone acetate)

Oxidation of 6β-fluorohydrocortisone acetate and 6α-fluorohydrocortisone acetate of Examples 8 and 9 with chromic acid in acetic acid or in accordance with the procedure disclosed in U. S. Patent 2,751,402 yielded 6β-fluorocortisone acetate and 6α-fluorocortisone acetate, respectively.

Example 11

6α-fluoro-11β,17α,21-trihydroxy-4-pregnene-3,20-dione (6α-fluorohydrocortisone)

A solution of 1.1 grams of 6α-fluorohydrocortisone acetate, 1.0 gram of potassium bicarbonate, 100 milliliters of methanol and fifteen milliliters of water was purged with nitrogen and stirred at 25 degrees centigrade for four hours. The solution was then neutralized by addition of acetic acid and the methanol was removed by distillation under reduced pressure. The residue was extracted with 100 milliliters of methylene dichloride and the extract, after drying over sodium sulfate, was chromatographed over a column of eighty grams of synthetic magnesium silicate. The product fraction was eluted with Skellysolve B hexanes plus twenty and thirty percent acetone and gave 770 milligrams of 6α-fluorohydrocortisone which melted at 192 to 195 degrees centigrade after crystallization from ethyl acetate-Skellysolve B hexanes. An analytical sample melted at 192 to 201 degrees centigrade and had a rotation of [α]$_D$ plus 127 degrees (chloroform).

*Analysis.*—Calcd. for $C_{21}H_{29}O_5F$: C, 66.29; H, 7.68; F, 4.99. Found: C, 66.28; H, 7.65; F, 4.43.

Following the procedure of Example 11, above, saponification of 6β-fluorohydrocortisone acetate, 6β-fluorocortisone acetate and 6α-fluorocortisone acetate of Examples 8 and 10 is productive of the corresponding 21-hydroxy compounds, 6β-fluorohydrocortisone, 6β-fluorocortisone and 6α-fluorocortisone.

As previously described, the 21-acyloxy products of this invention, e. g., the products of Examples 8, 9 and 10 can be hydrolyzed to the corresponding free 21-alcohols by the hydrolysis procedure described above. In the hydrolysis procedure, as previously stated, it is desirable to employ an oxygen-free solution and oxygen-free conditions and to use a molar excess of an alkali-metal bicarbonate such as potassium bicarbonate as a hydrolytic agent. The temperature is preferably held lower, i. e., between ten and about thirty degrees centigrade, and the hydrolyzed solution subsequently neutralized with an acid such as acetic acid.

Example 12

1-dehydro-6α-fluorohydrocortisone

Five 100-milliliter portions of a medium, in 250-milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis*, A. T. C. C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermenter was placed into the waterbath, adjusted to 28 degrees centigrade and the contents stirred (300 R. P. M.) and aerated (0.3 liter air per minute to five liters of beer). After 24 hours of incubation, when a good growth had been developed, five grams of 6α-fluorohydrocortisone acetate plus one-half gram of 3-ketobisnor-4-cholen-22-al, dissolved in 25 milliliters of dimethylformamide was added and the incubation carried out at the same temperature (28 degrees centigrade) and aeration for a period of 72 hours (final pH 8.3). The mycelium was filtered off and washed with water. The wash water was combined with the filtrate and the whole was extracted with three two-liter portions of a mixture of methylene-ethyl acetate (3:1). Removal of the solvent by evaporation gave 5.25 grams of crude solid which was triturated twice with four milliliters of methylene chloride to give 2.4 grams of 1-dehydro-6α-fluorohydrocortisone of melting point 198 to 203 degrees centigrade. The analytical sample, recrystallized from acetone, melted at 202 to 204 degrees centigrade. Analysis gave [α]$_D$ plus 73 degrees (dioxane) and the following:

*Analysis.*—Calcd. for $C_{21}H_{27}O_5F$: C, 66.65; H, 7.10; F, 5.02. Found: C, 66.68; H, 7.19; F, 5.49.

Similarly, fermentation of 6α-fluorocortisone acetate with *Septomyxa affinis* is productive of 1-dehydro-6α-fluorocortisone It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6-fluoro-11-oxygenated-17α, 21-dihydroxy- 4 - pregnene-3,20-dione of the following formula:

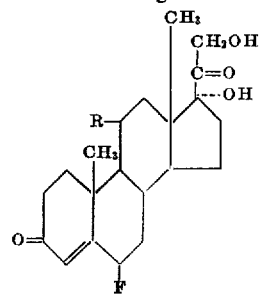

wherein R is selected from the group consisting of hydroxy and keto, and the 21-acylates thereof wherein the acyl radical is that of a hydrocarbon carboxylic acid containing from one to twelve carbon atoms, inclusive.

2. 6-fluorohydrocortisone and the 21-acylates thereof wherein the acyl radical is that of a hydrocarbon carboxylic acid containing from one to twelve carbon atoms, inclusive.

3. 6-fluorohydrocortisone.
4. 6α-fluorohydrocortisone.
5. 6β-fluorohydrocortisone.
6. 6-fluorohydrocortisone acetate.
7. 6α-fluorohydrocortisone acetate.
8. 6β-fluorohydrocortisone acetate.
9. 6-fluorocortisone and the 21-acylates thereof wherein the acyl radical is that of a hydrocarbon carboxylic acid containing from one to twelve carbon atoms, inclusive.
10. 6-fluorocortisone.
11. 6α-fluorocortisone.
12. 6-fluorocortisone acetate.
13. A 3-ketalized 3-keto-5α,6α-oxido-11-oxygenated-17-(20)-pregnene-21-carbonyloxy steroid represented by the following formula:

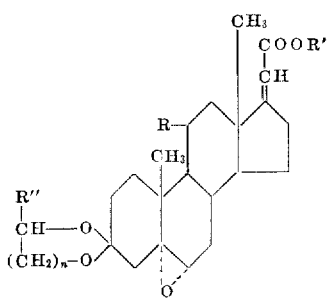

wherein R is selected from the group consisting of hydroxy and keto, R' and R" are selected from the group consisting of hydrogen and lower-alkyl, and n is a whole number from one to two.

14. The 3-ethylene ketal of methyl 3,11-diketo-5α,6α-oxido-17(20)-[cis]-pregnen-21-oate.

15. A compound selected from the group consisting of 3 - keto - 5α - hydroxy - 6β - fluoro-11-oxygenated-17(20)-pregnene-21-carbonyloxy steroid represented by the formula:

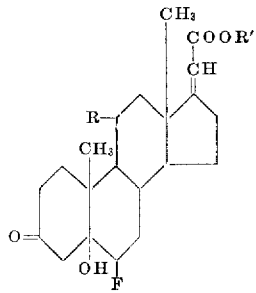

and the 3-cyclic ketals thereof represented by the following formula:

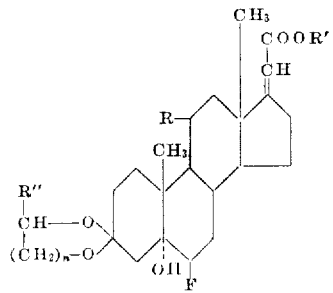

wherein R is selected from the group consisting of hydroxy and keto, R' and R" are selected from the group consisting of hydrogen and lower-alkyl, and n is a whole number from one to two.

16. The 3-ethylene ketal of methyl 3,11-diketo-5α-hydroxy-6β-fluoro-17(20)-allopregnen-21-oate.

17. Methyl 3,11 - diketo-5α-hydroxy-6β-fluoro-17(20)-allopregnen-21-oate.

18. 3-ketalized 3 - keto-5α,11β,21-trihydroxy-6β-fluoro-17(20)-allopregnene represented by the following formula:

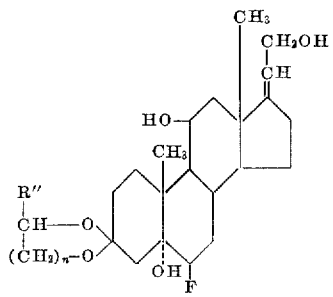

wherein R" is selected from the group consisting of hydrogen and lower alkyl, n is a whole number from one to two, and 21-acylates thereof wherein the acyl radical is that of a hydrocarbon carboxylic acid containing from one to twelve carbon atoms, inclusive.

19. The 3-ethylene ketal of 5α,11β,21-trihydroxy-6β-fluoro-17(20)-allopregnen-3-one.

20. The 3-ethylene ketal of 5α,11β-dihydroxy-21-acetoxy-6β-fluoro-17(20)-allopregnen-3-one.

21. A compound selected from the group consisting of 5α,11α,17α-trihydroxy-21-acyloxy-6β-fluoroallopregnan-3-one represented by the following formula:

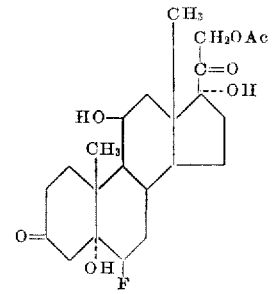

and 3-cyclic ketals thereof represented by the following formula:

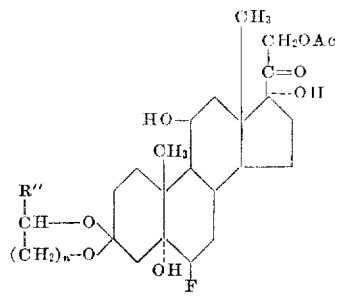

wherein R" is selected from the group consisting of hydrogen and lower alkyl, n is a whole number from one to two, and Ac is the acyl radical of a hydrocarbon carboxylic acid containing from one to twelve carbon atoms, inclusive.

22. The 3-ethylene ketal of 5α,11β,17α-trihydroxy-21-acetoxy-6β-fluoroallopregnan-3,20-dione.

23. 5α,11β,17α - trihydroxy - 21 - acetoxy-6β-fluoroallopregnan-3,20-dione.

24. A process for the production of 6-fluoro-11β,17α-dihydroxy-21-acyloxy-4-pregnene-3,20-dione of the following formula:

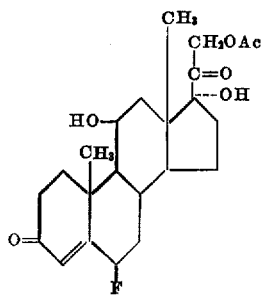

wherein Ac is the acyl radical of an organic carboxylic acid containing from one to twelve carbon atoms, inclusive, which comprises: (1) epoxidizing a compound of the following formula:

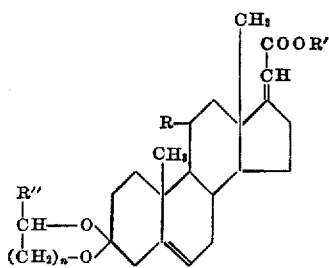

wherein R is selected from the group consisting of hydroxy and keto, R' and R" are selected from the group consisting of hydrogen and lower alkyl, and n is a whole number from one to two, with an epoxidizing agent to form the corresponding 5α,6α-oxide; (2) reacting the said 5α,6α-oxide with a fluorinating agent to produce the corresponding 3-keto-5α-hydroxy-6β-fluoro-11-oxygenated-17(20)-allopregnene-21-carbonyloxy compound; (3) ketalizing the said 3-keto-6-fluoro compound to produce the corresponding 3-ketal; (4) reducing the said 3-ketalized compound with a carboxyl reducing agent in an organic reaction medium to produce the corresponding 3-ketalized 5α,11β,21-trihydroxy-6β-fluoro-17(20)-allopregnen-3-one; (5) esterifying the said 3-ketalized 11β,21-dihydroxy compound with an esterifying agent to produce the corresponding 21-ester; (6) oxidatively hydroxylating the said 21-ester with osmium tetroxide and an oxygen-donating oxidizing agent to produce the corresponding 3-ketalized 17α-hydroxy compound; (7) deketalizing the said 3-ketalized 17α-hydroxy compound by hydrolysis to produce the corresponding 3-keto compound, and (8) dehydrating the said 3-keto compound to produce 6-fluoro-11β,17α-dihydroxy-21-acyloxy-4-pregnene-3,20-dione.

25. A process for the production of compounds of the following formula:

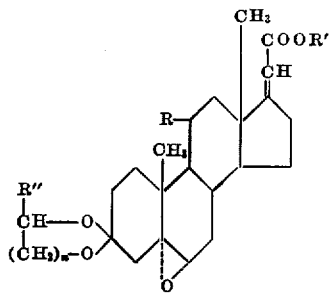

wherein R is a member selected from the group consisting of hydroxy and keto, R' and R" are members selected from the group consisting of hydrogen and lower alkyl, and n is a whole number from one to two, which comprises: epoxidizing a compound of the following formula:

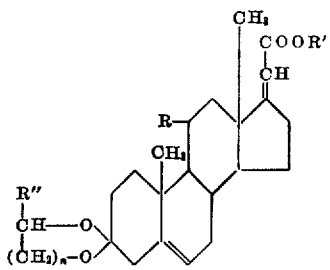

wherein R, R', R" and n are defined as above, with an epoxidizing agent to produce the said 5,6-oxido compound.

26. The process of claim 25 wherein the epoxidizing agent is a member selected from the group consisting of perbenzoic acid and peracetic acid.

27. A process for the production of compounds of the following formula:

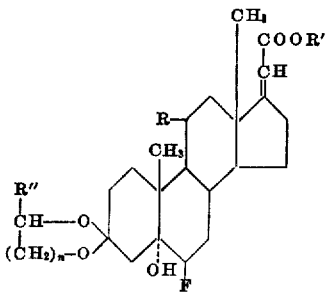

wherein R is a member selected from the group consisting of hydroxy and keto, R' and R" are members selected from the group consisting of hydrogen and lower alkyl, n is a whole number from one to two, which comprises: reacting a compound of the following formula:

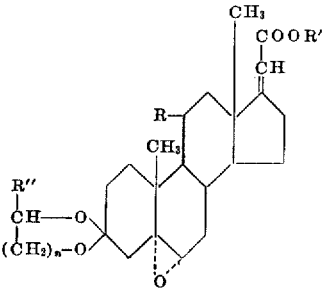

wherein R, R', R" and n are defined as above, with a fluorinating agent to produce the corresponding 3-keto-5α-hydroxy-6β-fluoro - 11 - oxygenated-17(20)-pregnene-21-carbonyloxy compound, and reacting the said 3-keto compound with a ketalizing agent.

28. The process of claim 27 wherein the fluorinating agent is hydrofluoric acid and the ketalizing agent is ethylene glycol in the presence of an acid catalyst.

29. A process for the production of compounds of the following formula:

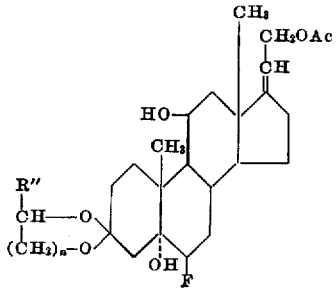

wherein R" is a member selected from the group consisting of hydrogen and lower alkyl, n is a whole number from one to two, and Ac is the acyl radical of an organic carboxylic acid containing from one to twelve carbon atoms, inclusive, which comprises: reducing a compound of the following formula:

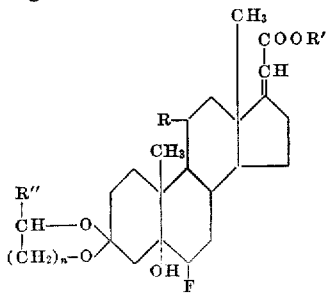

wherein R is a member selected from the group consisting of hydroxy and keto, R' and R" are members selected from the group consisting of hydrogen and lower alkyl, and $n$ is defined as above, with a reducing agent to produce the corresponding 3-ketalized 3-keto-5α,11β,21-trihydroxy-6β-fluoro-17(20)-allopregnene, and esterifying the said trihydroxy compound with an esterifying agent.

30. The process of claim 29 wherein the reducing agent is lithium aluminum hydride and the esterifying agent is a member selected from the group consisting of acid anhydrides and acid halides of organic carboxylic acids containing from one to twelve carbon atoms, inclusive.

31. A process for the production of compounds of the following formula:

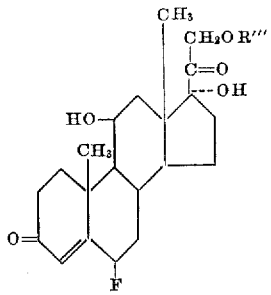

wherein R''' is a member selected from the group consisting of hydrogen and the acyl radical of an organic carboxylic acid containing from one to twelve carbon atoms, inclusive, which comprises: oxidatively hydroxylating a 3-ketalized 3-keto-5α,11β-dihydroxy-21-acyloxy-6β-fluoro-17(20)-allopregnene, with osmium tetroxide and an oxidizing agent, wherein the acyl radical is defined as above, to produce the corresponding 3-ketalized 17α-hydroxy compound; deketalizing the said 3-ketalized 17α-hydroxy compound by hydrolysis to produce the corresponding 3-keto compound, and dehydrating the said 3-keto compound with a mineral acid.

32. The process of claim 31 wherein the oxidative hydroxylating agent is osmium tetroxide and an amine oxide peroxide, hydrolysis is by an acid hydrolyzing agent, and the dehydrating agent is acetic acid.

33. A process for the production of compounds of the following formula:

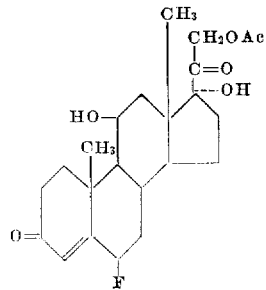

wherein Ac is the acyl radical of an organic carboxylic acid containing from one to twelve carbon atoms, inclusive, which comprises: reacting a compound of the formula:

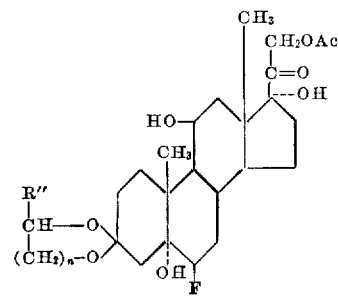

wherein Ac is as above defined, R" is selected from the group consisting of hydrogen and lower-alkyl, and $n$ is a whole number from one to two, with a mineral acid.

34. A process for the production of compounds of the following formula:

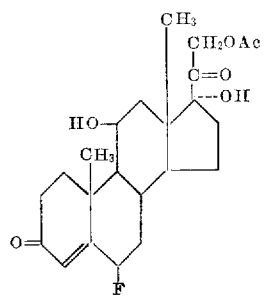

wherein Ac is the acyl radical of an organic carboxylic acid containing from one to twelve carbon atoms, inclusive, which comprises: reacting a compound of the formula:

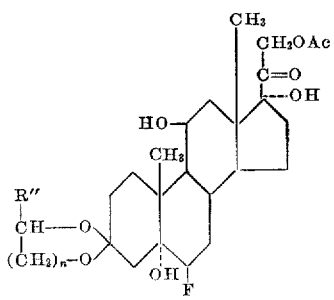

wherein Ac is defined as above, R" is selected from the group consisting of hydrogen and lower-alkyl, and $n$ is a whole number from one to two, with hydrochloric acid.

35. A process for the isomerization of a 6β-fluoro compound of the following formula:

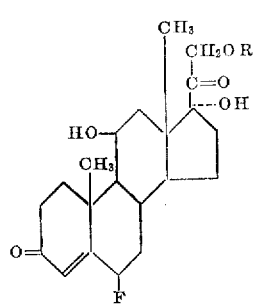

wherein R is selected from the group consisting of hydrogen and the acyl radical of an organic carboxylic acid containing from one to twelve carbon atoms, inclusive, to the corresponding 6α-fluoro compound, which comprises: reacting the 6β-fluoro epimer with a mineral acid in the presence of a prototropic agent to obtain the corresponding 6α-fluoro epimer.

36. A process for the isomerization of the 6β-fluoro compound of the following formula:

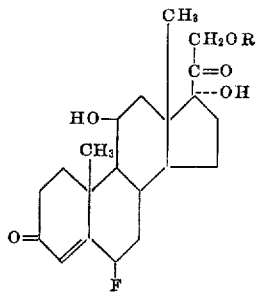

wherein R is selected from the group consisting of hydrogen and the acyl radical of an organic carboxylic acid containing from one to twelve carbon atoms, inclusive, to the corresponding 6α-fluoro compound, which comprises: reacting the 6β-fluoro epimer with hydrochloric acid in the presence of an alcohol to obtain the corresponding 6α-fluoro epimer.

References Cited in the file of this patent

UNITED STATES PATENTS

| | | |
|---|---|---|
| 2,707,184 | Hogg et al. | Apr. 26, 1955 |
| 2,742,461 | Bernstein et al. | Apr. 17, 1956 |
| 2,781,368 | Heyl et al. | Feb. 12, 1957 |

OTHER REFERENCES

Mattox et al.: J. Biol. Chem. 197 (1952), page 263.

UNITED STATES PATENT OFFICE

Certificate of Correction

Patent No. 2,838,497

June 10, 1958

George B. Spero, et al.

It is hereby certified that error appears in the printed specification of the above numbered patent requiring correction and that the said Letters Patent should read as corrected below.

Column 7, line 7, for "-17(29)-" read —-17(20)-—; column 8, line 37, for "methymorpholine" read —methylmorpholine—; column 12, line 34, for "11α" read —11β—.

Signed and sealed this 17th day of March 1959.

[SEAL]

Attest:
KARL H. AXLINE,
Attesting Officer.

ROBERT C. WATSON,
Commissioner of Patents.